United States Patent [19]
Robertson

[11] Patent Number: 5,344,597
[45] Date of Patent: Sep. 6, 1994

[54] METHOD AND APPARATUS FOR MAKING STEEL SHEETS

[76] Inventor: Harry J. Robertson, 529 N. State St., Dover, Del. 11901

[21] Appl. No.: 57,646

[22] Filed: May 4, 1993

Related U.S. Application Data

[63] Continuation-in-part of Ser. No. 878,665, May 4, 1992, abandoned.

[51] Int. Cl.$^5$ .................. B29C 39/14; B29C 39/44; B22D 11/01
[52] U.S. Cl. .................. 264/40.6; 55/244; 95/205; 95/226; 95/234; 164/81; 164/484; 264/102; 264/165; 264/298; 264/DIG. 78; 425/74; 425/75; 425/143; 425/162; 425/223; 425/224; 425/DIG. 60; 65/99.2
[58] Field of Search .................. 264/101, 102, 37, 166, 264/298, 165, 40.6, 40.4, DIG. 78; 425/73, 74, 75, 224, 162, 223, DIG. 60, 143; 164/81, 61, 62, 474, 253, 410, 459, 484; 55/244; 95/205, 226, 234; 65/99.2, 99.3

[56] References Cited

U.S. PATENT DOCUMENTS

| | | | |
|---|---|---|---|
| 2,298,348 | 10/1942 | Coxe | 164/81 |
| 3,356,461 | 12/1967 | Lynch et al. | 264/102 |
| 3,565,154 | 2/1971 | Kuratomi | 164/81 |
| 3,783,933 | 1/1974 | Leedy | 164/58 |
| 3,999,911 | 12/1976 | Matsubara | 425/75 |
| 4,003,425 | 1/1977 | Middleton | 164/58 |
| 4,383,570 | 5/1983 | White | 164/57.1 |
| 4,411,056 | 10/1983 | Deminancuzk et al. | 29/527.7 |
| 4,527,609 | 7/1985 | Nugent | 164/253 |
| 4,559,992 | 12/1985 | Bedell et al. | 164/474 |
| 4,724,895 | 2/1988 | Mulsea | 164/253 |
| 4,747,443 | 5/1988 | Wilson | 164/58.1 |

Primary Examiner—Mathieu Vargot
Attorney, Agent, or Firm—Hopkins & Thomas

[57] ABSTRACT

A method and apparatus for forming sheets of a first material, such as a metal, plastic, rubber, or the like, having a primary tank for heating a second molten material and containing the second molten material to form a surface upon which the first material is floated in a molten state. The temperature of the second molten material is maintained below the melting temperature of the first molten material, and the second molten material has a higher specific gravity than the first molten material. Thus, the first molten material floats upon the surface of the second molten material while it solidifies into a sheet of material, which is then withdrawn from the surface of the second molten material. A hood is disposed over the primary tank to remove fumes and vapors which, when removed, are discharged into water where they condense.

32 Claims, 5 Drawing Sheets

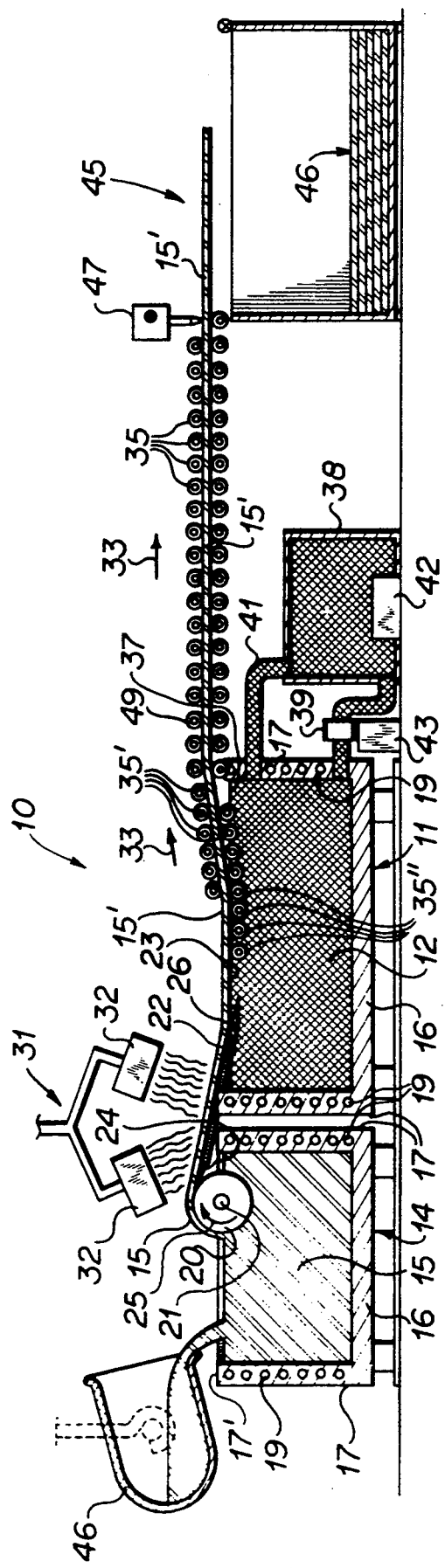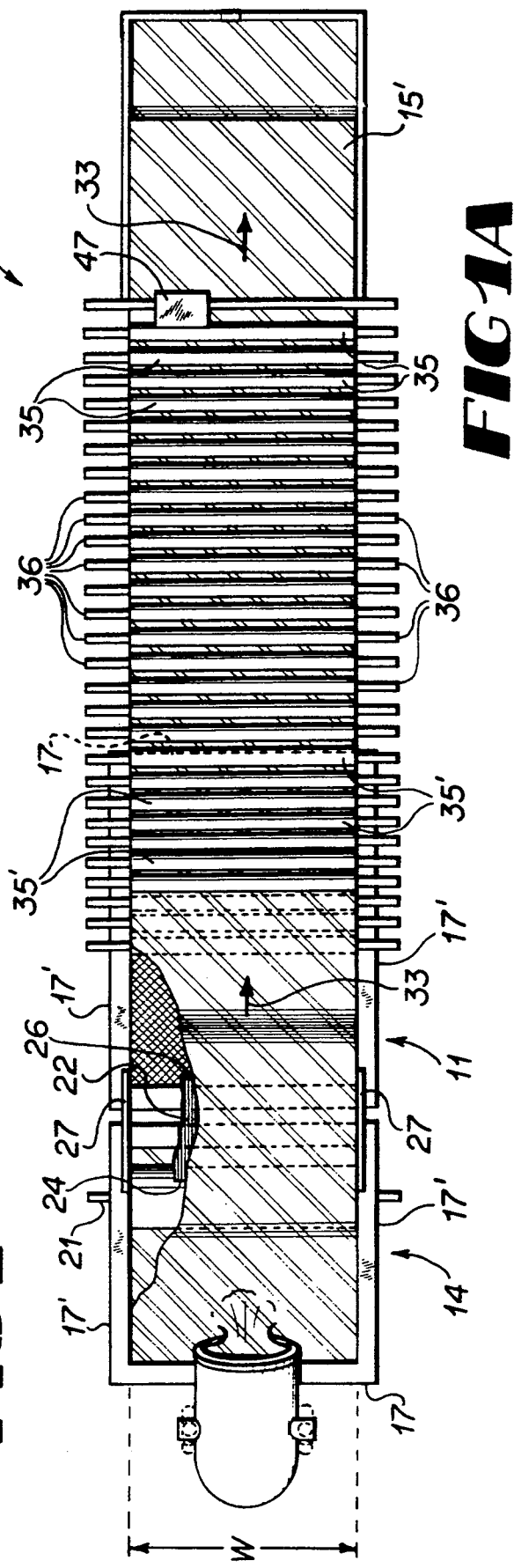

METHOD AND APPARATUS FOR MAKING STEEL SHEETS

This is a continuation in part of copending application Ser. No. 07/878,665 filed on May 4, 1992, now abandoned.

FIELD OF INVENTION

The present invention relates to a method and apparatus for forming continuous thin sheets of material, such as metal, plastic, rubber, or the like, utilizing a direct casting process.

BACKGROUND OF THE INVENTION

Methods and apparatus for producing thin sheets of material, such as metal, plastic, rubber, and the like, are generally similar regardless of the material. In the steel industry, for example, these methods and apparatus as applied to the formation of steel sheets give rise to problems common to the production of sheets of all such materials.

The steel industry today, particularly in the United States, is facing increased labor costs and increasing aggressive foreign competition, while still using, in large part, outdated manufacturing technologies. As a consequence, the larger integrated steel producers, with their inefficient and labor intensive manufacturing processes, are losing their customary share of the market and, consequently, are being forced to reduce or cease production in many of their product lines. The larger American steel makers today produce less than half of this country's steel shipments, while the smaller, more specialized companies have been able to remain competitive and even increase market share. As a result, the trend in the steel manufacturing industry is away from the large integrated plants to the smaller, more specialized "mini-mills", which have the flexibility to incorporate advances in technology into their manufacturing processes, which allows them to operate with lower labor costs and, hence, more efficiently. However, many of these mini-mills are relocating or starting up outside of this country where labor costs are lower. A reversal of this trend and a restoration of economic viability to the steel industry in this country can at least partially be achieved through the development and use of new manufacturing technologies for the production of steel sheets, for example, that are aimed at increased productivity, lowered production costs, and improved product quality.

Many of the new manufacturing processes being developed for the production of steel sheets are directed at replacing the labor and capital intensive processes and techniques of the rolling mill in which steel sheets are produced. In a typical steel mill, once a slab of steel has been produced it must be mechanically worked, usually by a rolling process, in what are known as "rolling mills," in order to produce various finished products, such as plates or sheets of metal. Inasmuch as labor is the major cost associated with the operation of these rolling mills, a need exists for a method and apparatus for producing finished metal products, such as sheet steel, that reduce the high labor costs associated with these rolling mills and, in turn, makes steel producers more competitive.

In the past, and to a large extent at the present time, sheets of metal, such as steel or aluminum, have been produced by a process that utilizes ingot molds made of cast iron, for example, to produce oblong ingots, which are mechanically rolled into sheets. Another method for producing sheets of metal is a continuous casting method wherein molten metal, teemed in an elevated tundish, flows through an opening in the bottom thereof into a water-cooled cooper mold. Within this mold, the metal cools and solidifies as it is continuously advanced toward the rolling apparatus where it is mechanically rolled into sheets. However, both the ingot-mold method and the continuous casting method are both capital and labor intensive processes.

One technique that has reduced the expenses associated with the rolling mill is a direct casting process for sheets of metal. In direct casting, a layer or sheet of metal is drawn directly from a tundish of heated substantially molten metal. With this method, a sheet of metal thinner than that produced by the tundish and copper mold of the continuous casting method can be produced, thereby reducing the amount of subsequent mechanical work that is, rolling, necessary to produce extremely thin sheets of metal. However, direct casting does not eliminate the need for subsequent mechanical working because the use of soft, heated metal limits the thinness of the sheet metal that can be drawn from the tundish. Hence, a relatively significant amount of additional mechanical working is necessary to achieve the extremely thin sheets of metal with desirable mechanical properties that many industries desire.

Thus, a need exists for a method and apparatus for producing extremely thin sheets of material having high strength characteristics which substantially replaces the present method and apparatus of the rolling mill.

SUMMARY OF THE INVENTION

The present invention is a method and apparatus for producing extremely thin sheets of metal and other types of material by directly casting the thin sheets from a tundish of molten metal. While the method and apparatus may be used to produce plates or sheets of many types of materials, such as plastics, polyethylene, and rubber, for the purpose of clarity, the present invention will be discussed with regard to the production of metal sheets, such as steel sheets. However, it should be understood that the present invention is not limited in scope to the manufacture of steel sheets.

The method comprises, in general, introducing a first molten metal onto the surface of a second molten metal having a lower temperature and higher specific gravity than the first molten metal and solidifies into a solid sheet of metal. A primary tank is provided for containing and heating the second molten metal, which for the production of steel sheets may be lead and which when filled with molten metal, defines a substantially rectangular surface of the second molten metal. Adjacent one end of the primary tank is positioned a means for uniformly floating the first molten metal, such as steel or aluminum, onto the surface of the second molten metal. Such floating means comprises a rotatable roller, partially immersed within the first molten metal, and a scraper and chute for removing the first molten metal clinging to the surface of the rotating roller and uniformly delivering the molten metal thus removed onto the surface of the second molten metal. At the opposite end of the primary tank is positioned a means for removing the first molten metal, after it has solidified, from the surface of the second molten metal. The thickness of the sheet material can be controlled by adjusting the rotational speed of the roller and the rate at which the solidified sheet is removed from the primary tank.

When the temperature of the first metal is much greater than that of the second metal, for example, 2400 degrees Fahrenheit for steel, the first molten metal, and 600 degrees Fahrenheit for lead, the second molten metal, a difference of 1800 degrees, the first molten metal rapidly solidifies upon contact with the second molten metal. The rapid solidification of the first metal results in the formation of a thin sheet of first metal on top of the second metal. It is necessary, however, that the two molten metals be immiscible with respect to one another and that the second molten metal have a specific gravity greater than the specific gravity of the first molten metal, thereby causing the first molten metal to float on the surface of the second molten metal.

The rapid solidification of the first metal invests it with a fine-grained, substantially homogeneous microstructure, which gives the sheet metal high strength characteristics and, thus, substantially eliminates the need for subsequent mechanical working. Also, as the first molten metal solidifies on the surface of the second molten metal, natural forces of weight and surface tension bring it to a uniform thickness resulting in surface finishes that are extremely smooth and, subsequently, uncontaminated.

A hood is disposed over the top portion of the molten metal, this hood having a duct and a blower by which a partial vacuum is drawn on the hood so that air is drawn over the surface of the molten lead and discharge into a water bath, thus, delivering the vapor fumes and gases escaping from the tank into the water where they are condensed and solidify for removal.

Accordingly, it is an object of the present invention to provide a method and apparatus for producing sheets of material that require little or no mechanical rolling.

Another object of the present invention is to provide a method and apparatus for producing sheets of material having a smooth, uniform, and uncontaminated surface.

Another object of the present invention is to provide a method and apparatus for reducing the production costs of sheet material.

Another object of the present invention is to provide a method and apparatus for reducing the processing time for producing sheet material as compared to prior art methods.

Another object of the present invention is to provide an apparatus for producing sheet material which is simple in design, efficient in operation, and structurally durable.

Another object of the present invention is to provide a method and apparatus for producing sheet material by floating a lighter metal on molten lead bath and wherein the fumes, gases and vapors arising from the lead bath are collected and condensed.

Other objects, features, and advantages of the present invention will become apparent from the following specification and accompanying drawings

BRIEF DESCRIPTION OF THE DRAWINGS

The present invention, as defined in the claims, can be better understood with reference to the following drawings. The drawings are not necessarily to scale, emphasis instead being placed upon clearly illustrating principals of the present invention FIG. 1 is a diagrammatic side elevation view in cross-section of the present invention illustrating the roller arrangement for introducing the first molten metal onto the surface of the second molten metal;

FIG. 1A is a plan view of the apparatus of FIG. 1 illustrating the relative widths of tanks and of various rollers;

DETAILED DESCRIPTION OF THE PREFERRED EMBODIMENT

Figure 2:
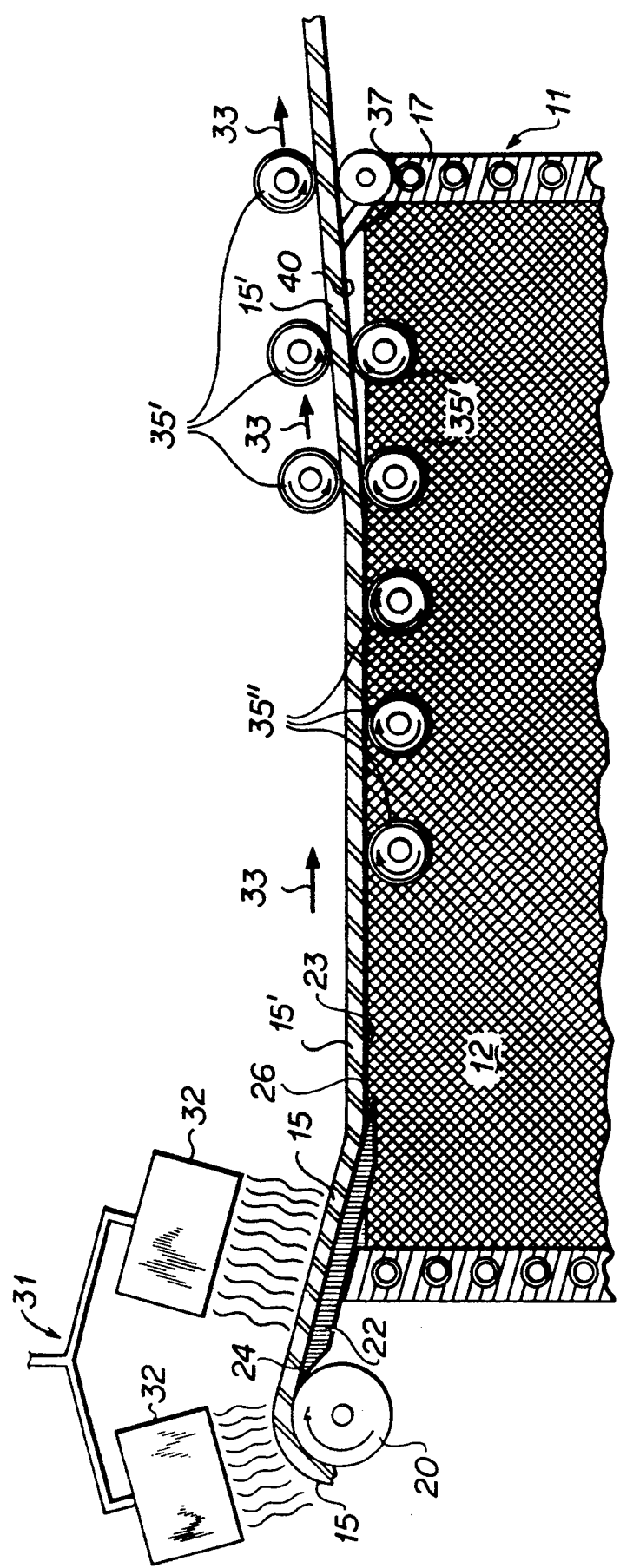
FIG. 2 is a detail diagrammatic elevation view in cross-section of the surface of the second molten metal illustrating the solidification process of the first molten metal and the means for removing the solidified sheets of metal from the surface of the second molten metal.

Referring now in more detail to the drawings, in which like numerals represent like parts throughout the several views, FIG. 1 illustrates an apparatus 10 and method for producing plates or sheets of metal, which embodies principles of the present invention in a preferred form. The apparatus 10 illustrated in FIG. 1 comprises a primary tank 11 of molten lead 12 and a secondary tank 14 of molten steel 15 positioned adjacent the tank 11. Both tanks 11 and 14 are generally rectangular in shape and each has a floor 16 with four side walls 17 made of a suitable refractor material, such as a ceramic material. The tanks 11 and 14 are filled with their respective molten metals to a level where the surface of each molten metal is just below the top edge of the side walls 17. An induction heating system for each tank is used to heat the lead 12 and steel 15 and comprises a set of induction heating coils 19 disposed within the side walls 17 of each tank and connected to a suitable power supply, which apparatus and methodology is well known in the art. It should be understood, however, that various other means for heating the lead 12 and steel 15 are suitable for this purpose, such as a gas heating system.

Preferably, the longitudinal sides 17' of tank 11, as shown in FIG. 1A are parallel in order to facilitate the production of sheet metal with parallel edges, which steel metal can then be rolled easily into a coil or cut into plates. However, as an alternative method for ensuring a consistent width of the sheet metal, a sheet metal edge trimming station, well known in the art, could be positioned downstream of the sheet metal production apparatus 10. Moreover, the width w of the molten lead tank 11 can vary depending upon the application, and it is generally desirable for design purposes that the molten steel tank 14 have a width corresponding to the width w of the molten lead tank 11.

The tank 14 of molten steel 15, a pick-up roller 20, and a chute 22 serve the purpose of introducing the molten steel 15 onto the surface 23 of the molten lead 12. Molten steel pick-up roller 20 is positioned within the molten steel tank 14 so that the pick-up roller 20 is partially submerged in the molten steel 15, and the pick-up roller 20 extends the width w of the tank 14 to the side walls 17 thereof wherein the roller axle 21 is journaled. An appropriate drive means (not shown) is coupled to the axle 21 of pick-up roller 20 and is adapted to receive a signal from a control means (not shown) and to rotate the pick-up roller 20 in response thereto in the direction indicated by an arrow 25. As pick-up roller 20 rotates in the direction of arrow 25, molten steel 15 adheres to the surface thereof, which is preferably lined with a suitable heat resistant material.

The chute 22 is positioned between the pick-up roller 20 and one end of the molten lead surface 23, and acts as a chute or trough for uniformly delivering the molten steel 15 to the molten lead surface 23. The chute 22 delivers the molten steel 15 by scraping the adhered molten steel 15 from the surface of the pick-up roller 20 by means of a sharp leading edge 24 secured in abutment with the rotating surface of the pick-up roller 20. The chute 22 is angled downwardly from the chute leading edge 24 to the chute delivery end 26, which extends into the molten lead 12. After the molten steel 15 is scraped from the surface of the pick-up roller 20, the molten steel advances down the chute 22 and onto the molten lead surface 23. As shown in FIG. 1A, chute 22 has side walls 27 which function to contain the molten steel 15 as it advances down through the chute 22. Chute 22, preferably, is copper-lined or otherwise lined with an appropriate material to facilitate the downward movement of the molten steel. Copper is a desirable material for this purpose due to its nonadhesive nature with respect to steel, and its higher fusion temperature.

Above the rotating surface of the pick-up roller 20 and above the chute 22, a heat source 31 is disposed for applying heat to the molten steel 15 in order to maintain its temperature at an appropriate level. Heat source 31 comprises, for example, a pair of radiant heaters 32 aimed at the pick-up roller 20 and the chute 22. These heaters maintain the molten steel 15 at a high temperature up to the point where the molten steel 15 is deposited onto the molten lead surface 23, which is maintained at a much lower temperature. For example, in producing stainless steel, it is desirable to maintain the molten steel at approximately 2400 degrees Fahrenheit while maintaining the molten lead at approximately 600 degrees Fahrenheit. This large temperature difference of 1800 degrees causes the molten steel 15 to solidify rapidly on the surface of the molten lead 12, which results in a fine-grained, homogeneous microstructure of the steel having desirable mechanical properties.

Lead (Pb) is a desirable metal for the primary tank 11 because of its relatively high specific gravity and immiscibility with respect to the other metals. The high specific gravity of the molten lead 12 causes the solidified steel 15' to float upon the surface 23 of the molten lead 12, as best shown in FIG. 2. The sheet 15' of steel is formed having an extremely smooth finish, which eliminates the need for any subsequent surface smoothing operations.

It should be understood, however, that materials other than lead can be used for the liquid in the primary tank. It is simply necessary that the material used in the primary tank have a specific gravity greater than, and a melting temperature lower than, the specific gravity and melting temperature, respectively, of the material used to make the plates or sheets. Also, it is necessary that the two materials be immiscible with respect to one another.

A series of spaced parallel roller bars 35 are positioned at the end of the primary tank 11 opposite the chute 22. These roller bars 35 act as a means for removing the solidified sheet of steel 15' from the surface 23 of the molten lead 12, and do not mechanically work on the sheet metal 15' in any way other than to advance and support the sheet metal 15' outwardly from the primary tank 11. The roller bars 35 are spaced apart along the path of movement of sheet metal 15', as shown by arrows 33, starting within the primary tank 11 at the molten lead surface 23 and extending outwardly beyond the end of the primary tank 11. As best shown in FIG. 2, the initial roller bars 35' within the primary tank 11 that are not completely submerged within the molten lead 12 are positioned relative to each other in an ascending manner so that the peripheral surfaces of the roller bars contacting the sheet metal 15' form, in conjunction with submerged roller bars 35'', an inclined path along which the sheet metal 15' may advance upwardly out of the tank 11 as seen in FIG. 2. The inclined angle of the path formed thereby is minimal, preferably 5 degrees or less, so as to reduce any bending of the sheet metal 15'.

The roller bars 35 are arranged in a paired manner with one of each pair of roller bars directly above the other and spaced therefrom a sufficient distance to allow the sheet metal 15' to pass between them. An appropriate support means (not shown) rotatably supports the axles 36, shown in FIG. 1A, of the roller bars 35 so that the roller bars 35 engage the sheet metal with a minimum of force necessary to create sufficient friction to propel the sheet metal 15' outward from the primary tank 11, and an appropriate drive means (now shown) is adapted to rotate one or more of the roller bars 35, preferable at least one of the initial roller bars 35'' within tank 11. A scraper blade 37 is positioned atop the side wall 17 of primary tank 11 beneath the advancing sheet of metal 15' and is positioned to engage or scrape the bottom surface 40 of the sheet of metal 15', thereby causing any residual molten lead adhering to the sheet of metal 15' to be returned to the tank 11.

An accumulator tank 38, a pump 39, and a return pipe 41 act as an auxiliary means for controlling the temperature of the molten lead 12 as well as the surface level of the molten lead 12. The accumulator tank 38 includes a heater and cooler unit 42 connected to a thermostat (not shown) within tank 11. When the temperature of the molten lead drops, for example, pump 39 is activated by motor 43, thereby pumping into the primary tank 11 molten lead having a temperature adjusted by the heater/cooler unit 42. The molten lead 12 within the primary tank 11 returns to the accumulator tank 38 through return pipe 41. Also, the pump 39 is preferably controlled by a computerized control system (not shown), which functions to maintain the level of the molten lead 12 within tank 11, such as a conventional float control system.

Downstream of the roller bars 35, the metal sheet 15' is further processed. For example, a cutting station 45 may be disposed as shown for cutting the metal sheet 15' into plates 46 by implementation of a traveling saw 47. As a further example, the metal sheet 15' could also be rolled, which is well known in the art.

The operation of the apparatus 10 and method for producing plates or sheets of metal is hereinafter described in detail. During operation, a ladle 46, carrying molten steel collected from an electric furnace, for example, is used to continuously maintain the level of the molten steel 15 in tank 14, while induction heating coils 19 continuously maintain the temperature of the molten steel 15 at approximately 2400 degrees Fahrenheit for the production of stainless steel, for example. The pick-up roller surface of roller 20 is rotated at a predetermined speed, thereby drawing a thin film or layer of molten steel 15 onto the roller surface as the roller 20 rotates towards the sharp leading edge 24 of the chute 22. As shown in FIG. 2, the molten steel 15, maintained at its desired temperature by heat source 31, is scraped by the sharp edge 24 of chute 22 from the surface of the pick-up roller 20 into the chute 22, from which it uniformly flows onto the surface 23 of the molten lead 12.

Upon contacting the molten lead surface 23, the molten steel 15 rapidly solidifies into a sold sheet of steel 15'. Such rapid solidification, as previously mentioned, invests the steel with a fine-grained, homogeneous microstructure having desirable mechanical properties. In addition, the rapid solidification of the steel on the surface of the molten lead creates extremely smooth surface finishes on the sheets of steel.

The advancing sheet of steel 15' engages the initial submerged roller bars 35", one or more of which are driven, and which is the propelling force for moving the sheet of steel 15'. The inclined set of roller bars 35' lift the sheet of metal 15' from the surface 23 of the molten lead 12, as best shown in FIG. 2. While the advancing sheet of metal 15' moves through the inclined set of roller bars 35', the bottom surface of the metal sheet engages the scraper blade 37, whereby any residual molten lead is removed from the sheet of metal 15'. As shown in Fig. 1, the remaining set of roller bars 35 advance the sheet of metal 15' toward a downstream processing station, such as cutting station 45.

The process is computer controlled for flexibility of operation in order to fulfill a customer's particular specification. The control means, which, for clarity, is not shown, adjusts the rotational speed of pick-up roller 20 and roller bars 35 to produce the finished product of sheet metal having a desired thickness. The faster the rollers are driven, the thinner the sheet metal produced.

Figure 3:
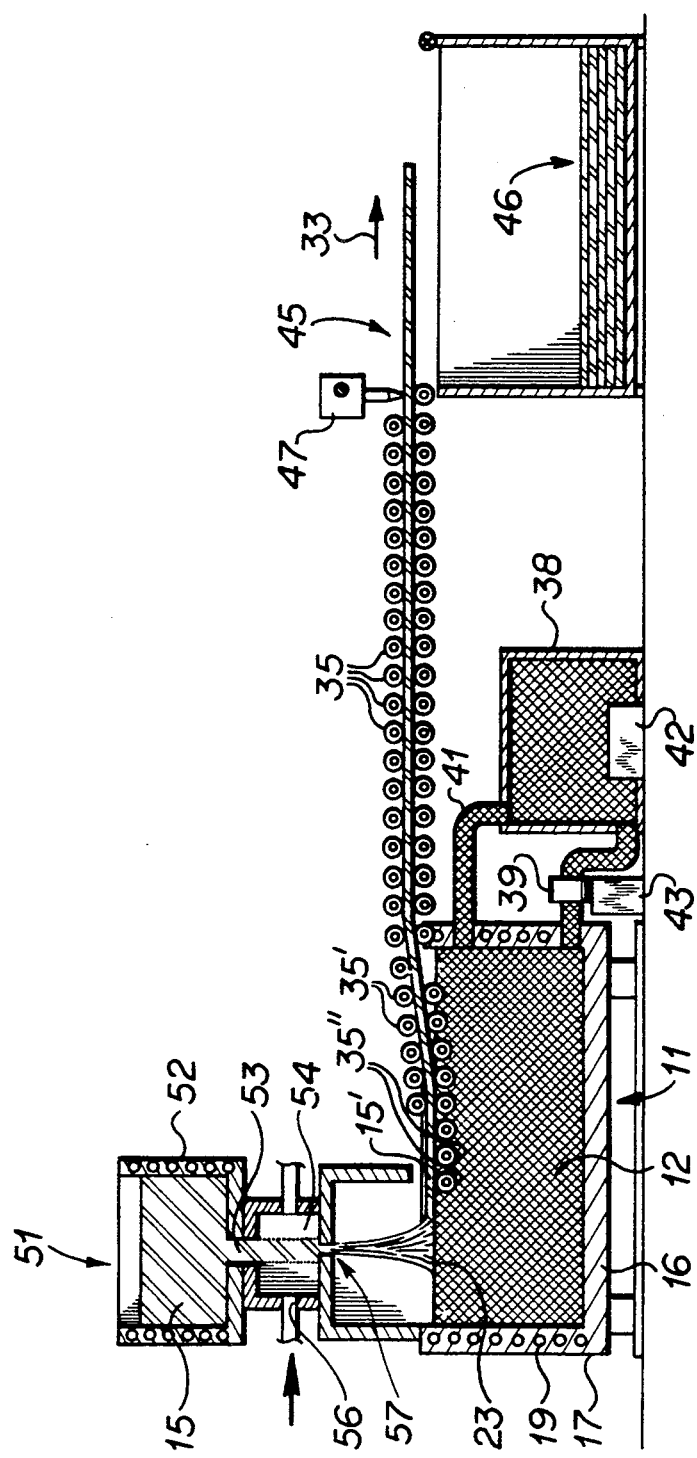
FIG. 3 is a diagrammatic elevation view in cross-section illustrating an alternative spray casting method for introducing the first molten metal onto the surface of the second molten metal.

FIG. 3 shows an alternate method and apparatus for introducing the molten steel 15 onto the surface 23 of the molten lead 12. A spray casting apparatus, indicated generally by reference numeral 51, is used to atomize the molten steel 15 and spray the molten steel onto the molten lead surface 23. The apparatus 51 comprises an induction heated ladle 52 having an opening 53 at the bottom thereof through which the molten steel 15 flows into an atomizer chamber 54. Therein, a high speed jet of nitrogen gas, for example, is introduced through opening 56 and atomizes the molten steel 15 as the molten steel is injected through nozzle 57. This process sprays a layer of molten steel onto the molten lead surface 23, whereupon, in a similar manner to the process illustrated in FIGS. 1 and 2, the molten steel 15 rapidly solidifies into a sheet of steel 15'. The process thereinafter remains unaltered.

Figure 4:
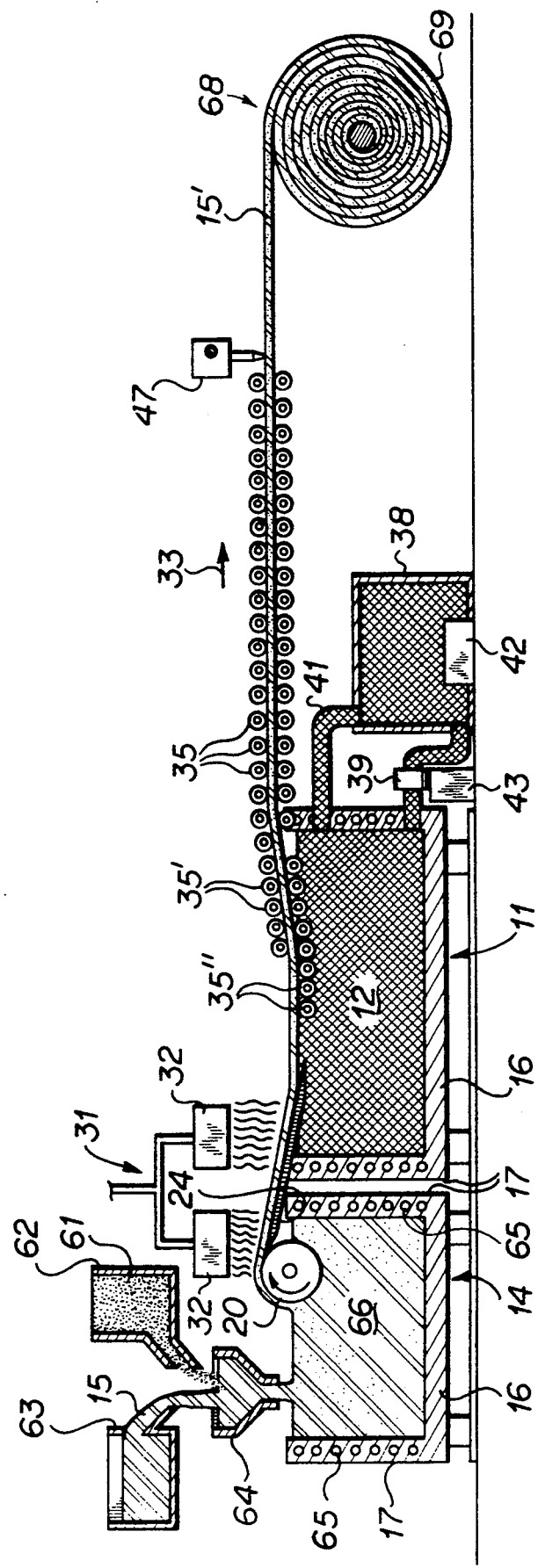
FIG. 4 is a diagrammatic elevation view in cross-section illustrating an alternative rheocasting method of mixing the first molten metal with reinforcing particles or fibers.

FIG. 4 illustrates the present invention as used with a rheocasting process. In a rheocasting process, reinforcing particles, or fibers 61, from a particulate hopper 62 are mixed with molten steel 15 from a tundish 63 in a chute 64. This mixing creates molten steel composite 66 having the characteristics of a partially solidified melt. Electromagnetic stirring coils 65 generate a moving field to stir the melt or composite 66 while pick-up roller 20 draws the composite from the secondary tank 14 whereinafter the process remains unaltered. The resulting metal-matrix composite material exhibits a very desirable high strength-to-weight ratio. FIG. 4 also shows an alternative downstream processing station 68 wherein the formed sheet metal 15' is wrapped into a coil 69.

It can be seen that the present invention comprises a method and apparatus for producing sheets of metal, or other materials, having minimal thicknesses, yet which are invested with microstructures having high strength characteristics. The large temperature differences between the two molten or liquid materials causes rapid solidification, and the differences in specific gravities between, and the immiscibility of, the two materials with respect to each other causes the less dense material to float upon the surface of the more dense material and form a sheet or plate having extremely smooth finishes and a uniform thickness throughout. Such a process produces a sheet of material having desirable mechanical properties without the need for subsequent mechanical working, and which therefore provides a means for producing a sheet of material more efficiently with lower production costs over prior art methods.

Figure 5:
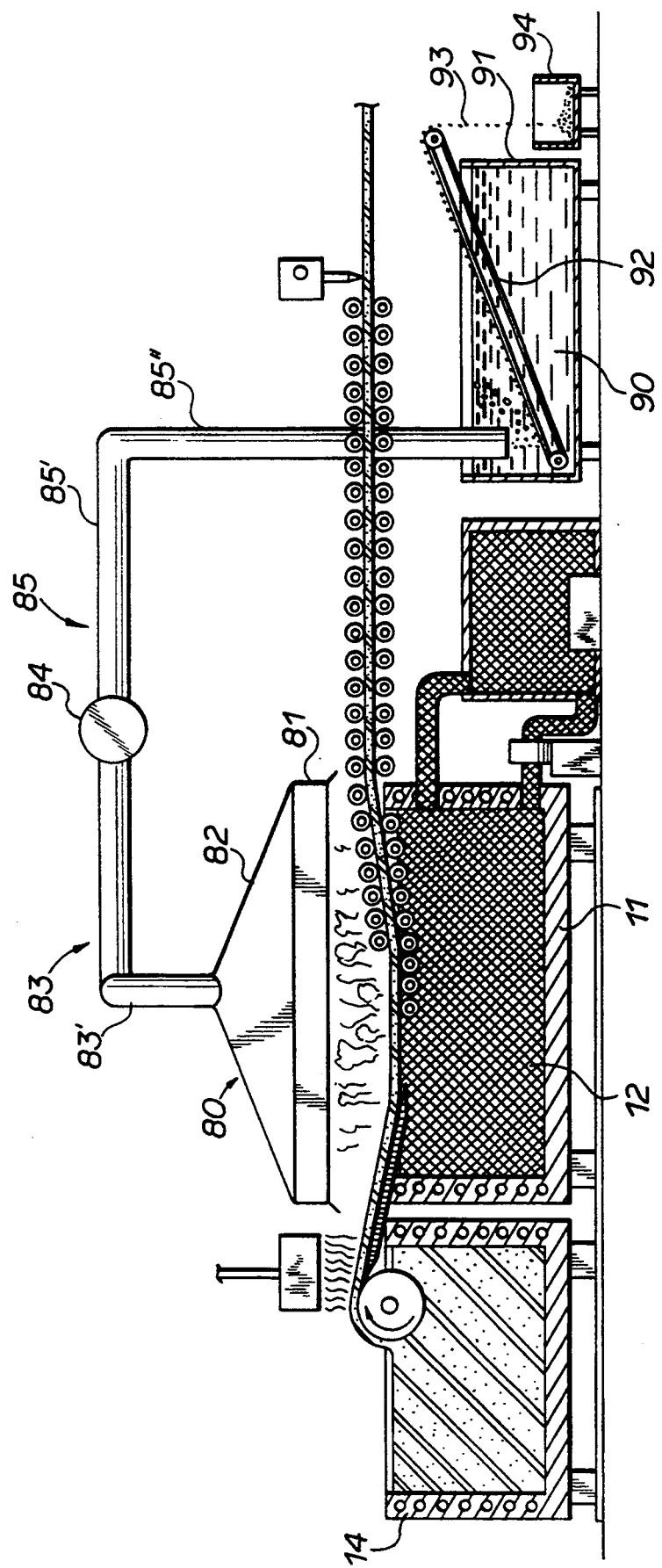
FIG. 5 is a side elevational view, partially in cross-section, showing the apparatus of FIG. 1 and 1A, provided with a hood assembly by which fumes, vapors, and gases from the lead both are captured and condensed.

The disclosure relating to FIGS. 1 through 4 is identical to the original disclosure in my application Ser. No. 07/878,665 filed May 4, 1992, now abandoned. The new material in this application relates to FIG. 5 and the process carried out with respect thereto. In FIG. 5, a hood 80 is disposed over the tank 11 and above the molten lead 12, and the solidifying steel 15. The hood 80 preferably is rectangular, conforming generally to the size and shape of the side walls of tank 11 so as to cover and overlie all of the surface of the molten lead 12. Preferably, the hood 80 is suspended from an overhead (not shown) so that it does not appreciably obstruct access to the tank 11. The hood 80 has a rectangular upright skirt 81 and a top 82, both formed of sheet metal. The skirt 81 depends from the outer perimetal edges of the top 82.

Top 82 converges upwardly and is provided with a central port, communicating with the lower end portion or mouth of the vertically disposed intake portion 83' of an exhaust or conduit duct 83. The upper end of vertical duct portion 83', connects to and communicates with one end of a horizontal intake portion 83" of intake duct 83, the distal end of intake portion 83" being connected to and communicating with the intake side of a blower 84.

The discharge side of blower 84 is connected to and communicates with a horizontally disposed portion 85' of discharge duct 85. The distal end of horizontally disposed portion 85' is connected to an end of a vertical discharge portion 85" of duct or conduit 85. The lower discharge end or mouth of discharge portion 85" is submerged in a water bath 90 contained in a vat 91.

Due to the partial vacuum drawn on hood 80, substantially all vaporized lead and/or other hot vapors, gases and fumes emanating from the surface of the lead 12 and/or the steel 15 are entrained in the directed flow of air as it is drawn into hood 80 and then passed, via duct 83 and blower 84 to discharge duct 85. The vacuum draws ambient air existing around the surface of the second molten material and thereby generates a flow of air over the surface. Depending, of course, upon what substances are used as the two molten materials in the tanks 11 and 14, there may be a variety of different fumes, gases or vapors which pass from tank 11 and are entrained in the air draft and withdrawn from above tank 14. For example, aluminum vapors could be generated in the event aluminum sheets are being produced.

As the air is discharged below the surface of water or liquid 90, the liquid being at a substantially lower temperature than the temperature of the second molten material so as to condense the vapors of the second molten material in the liquid, the vapors such as lead vapors are cooled and condensed by the water and fall or precipitate into the water bath 90 and onto the top flight of an inclined belt conveyor 92, whence, the precipitated particles 93 are conveyed out of water bath 90 and are dropped by gravity into an appropriate receptacle 94 disposed at a remote location to one side of vat 91. The condensed vapors may include both elemental lead and lead oxide, or aluminum vapors, as the case may be, and/or the other vapors which simply dissolve into and contaminate the water bath 90, the water acting as a scrubber which purifies the air bubbling up through the water. This scrubbed air is progressively released to the ambient air. Therefore, any harmful vapors, gases or fumes emanating from either the molten lead 12 or the steel 15 which is floating thereon, or other material which has been vaporized, will be conducted away from the tank 11 and condensed or dissolved or entrained in the water. The portion of such fumes, vapors and gases which are not separated from the air by the water bath 90 are thus released at a remote location from tank 11.

It will be apparent to those skilled in the art that numerous modifications may be made to the embodiments described above without substantially departing from the principles of the present invention. All such modifications are intended to be included herein with the scope of the present invention.

I claim:

1. A method of forming a continuous thin sheet of material, comprising the steps of:
    (a) heating a first material having a first melting temperature and a first specific gravity to produce a first molten material;
    (b) heating a second material having a second melting temperature and a second specific gravity to produce a second molten material, the second melting temperature being less than the first melting temperature, and the second specific gravity being greater than the first specific gravity, the first and second molten materials being immiscible with respect to each other;
    (c) containing the second molten material to expose an upper surface thereof;
    (d) floating the first molten material onto the upper surface of the second molten material;
    (e) maintaining the upper surface of the second molten material at a temperature less than the first melting temperature of the first molten material and greater than the second melting temperature;
    (f) allowing the first molten material to solidify while floating on the surface of the second molten material to form a sheet of the first material; and
    (g) withdrawing fumes, gases and vapors from the surface of said second molten material by entraining the fumes, gases and vapors in an air flow and passing said air flow into a liquid bath to thereby scrub the air flow of a portion of the fumes, gases and vapors.

2. The method defined in claim 1 wherein the step of withdrawing fumes, gases and vapors includes directing air over the surface of said second molten material and removing the directed air from the vicinity of said second molten material.

3. The method defined in claim 1 wherein said step of withdrawing fumes, gases and vapors from the surface of said molten material includes disposing a hood over said upper surface of said second molten material in which the first molten material is floating and creating an air draft from said hood and directing said air draft to a remote location for entraining the fumes, gases and vapors in the flow of air.

4. The method defined in claim 1 wherein the step of withdrawing fumes, gases and vapors includes disposing a hood over said upper surface of second molten material in spaced relationship thereto and creating a vacuum in said hood for drawing ambient air existing around said surface of said second molten material into said hood for entraining said fumes, gases and vapors and thereafter delivering the air as a stream below the surface of a liquid which is at a substantially lower temperature than the temperature of said second molten material so as to condense any second molten material fumes and precipitate the second molten material fumes into the lower temperature liquid.

5. The method defined in claim 1 wherein said second molten material is lead and the step of withdrawing fumes, gases and vapors includes generating a flow of air over the surface of said second molten material and directing this flow of air into a water bath for condensing lead fumes which have passed from said second molten material into said water so that the lead is precipitated therefrom and conveying the condensed lead progressively from said water bath.

6. The method defined in claim 1 wherein said second molten material is lead and said first molten material is steel and wherein said step of withdrawing fumes, gases and vapors from the surface of said second molten material includes collecting the fumes from the surface of said second molten material and directing them into a bath of water for condensing any lead vapors into a solid condition and thereafter removing the condensed lead from said water.

7. An apparatus for producing a continuous thin sheet of material, comprising:
    first means for heating a first material having a first melting temperature and having a first specific gravity into a first molten material;
    second means for heating a second material having a second melting temperature and having a second specific gravity into a second molten material, the second melting temperature being less than the first melting temperature, and the second specific gravity being greater than the first specific gravity, said first and second molten materials being immiscible with respect to each other;
    third means for containing the second molten material to expose an upper surface thereof;
    fourth means for floating said first molten material onto the upper surface of the second molten material to thereby form the continuous thin sheet; and
    exhaust means over the said upper surface of said second molten material for removing the fumes, gases and vapors released therefrom, means to entrain said fumes, gases and vapors in an air flow, and a liquid bath to thereby scrub the air flow of a portion of said fumes, gases and vapors.

8. The apparatus defined in claim 7 wherein said exhaust means includes a hood over said second molten material and a blower for creating a partial vacuum in said hood and for creating a flow of air and entrained fumes, gases and vapors and means for directing the flow of air into a liquid for condensing a portion of said fumes, gases and vapors.

9. The apparatus defined in claim 7 wherein said exhaust means includes a hood, a blower having an intake and a discharge, a conduit connected between said hood and said intake of said blower, a second conduit connected to the discharge of said blower, and a vat for containing water therein, the second conduit leading from the discharge side of said blower to a position beneath the level of said water whereby air passing into said hood entrains fumes, gases and vapors, emerging from the surface of said second molten material, and is conveyed from said hood into said water for condensing a portion of the fumes, gases and vapors.

10. The apparatus defined in claim 7 wherein said exhaust means includes a hood, a conduit, a means for directing air from said hood through said conduit, and a tank for containing water therein, said conduit discharging the air into said water.

11. The apparatus defined in claim 10 including a conveyor for removing particles condensed from the air which has been discharged into said water.

12. The method of forming a continuous thin sheet of material, comprising the steps of:
   (a) heating a first material having a first melting temperature and a first specific gravity to produce a first molten material;
   (b) heating a second material having a second melting temperature and a second specific gravity to produce a second molten material, the second melting temperature being less than the first melting temperature, and the second specific gravity being greater than the first specific gravity, the first and second molten material being immiscible with respect to each other;
   (c) containing the second molten material between opposed sides of a tank to expose an upper surface of said second molten material;
   (d) floating the first molten material onto the upper surface of the second molten material uniformly along a path extending transversely between the opposed sides of said tank, wherein the step of floating the first molten material onto the upper surface of said second molten material further comprises the steps of:
      (i) partially immersing a cylindrical roller into the first molten material;
      (ii) rotating the roller about its longitudinal axis so that a layer of first molten material is picked up and carried upon the surface of the roller;
      (iii) removing the layer of first molten material from the surface of the roller; and
      (iv) uniformly delivering the layer of first molten material to the upper surface of the second molten material;
   (e) maintaining the upper surface of the second molten material at a temperature less than the first melting temperature of the first molten material and greater than the second temperature; and
   (f) allowing the first molten material to solidify while floating on the upper surface of the second molten material to form a solidified sheet of the first material.

13. The method of claim 12, wherein the step of removing the layer of first molten material from the surface of the roller further comprises the steps of positioning a chute having a sharp leading edge contiguous to the surface of said roller, and scraping the first molten material from the surface of said roller.

14. The method of claim 12, wherein the step of uniformly delivering the layer of first molten material further comprises the step of passing said molten material down a chute.

15. The method of claim 12, wherein step (d) further comprises the step of applying heat to the first molten material in order to maintain and control the temperature of said first molten material prior to contact with the upper surface of the second molten material.

16. The method of claim 12, further comprising the step of removing the solidified sheet of said first material from the upper surface of the second molten material.

17. The method of claim 16, further comprising the step of engaging the solidified sheet of said first material from below with a series of parallel rollers extending transversely to the opposed sides of said tank, and rotatably driving at least one of the rollers.

18. The method of claim 12, further comprising the step of maintaining the level of the upper surface of the second molten material contained within said tank with respect to the first molten material floating thereon.

19. The method defined in claim 12 further including a step of withdrawing fumes, gases and vapors by directing air over the surface of said second molten material and removing the directed air from the vicinity of said second molten material.

20. The method defined in claim 12 further including a step of withdrawing fumes, gases and vapors from the surface of said second molten material by disposing a hood over said upper surface of said second molten material in which the first molten material is floating, creating an air draft from said hood and directing said air draft to a remote location for entraining the fumes, gases and vapors in the flow of air.

21. The method defined in claim 12 further including a step of withdrawing fumes, gases and vapors by disposing a hood over said upper surface of second molten material in spaced relationship thereto and creating a vacuum in said hood for drawing ambient air existing around said surface of said second molten material into said hood for entraining said fumes, gases and vapors and thereafter delivering the air as a stream below the surface of a liquid which is at a substantially lower temperature than the temperature of said second molten material so as to condense any second molten material fumes and precipitate the second molten material fumes into the lower temperature liquid.

22. The method defined in claim 12 wherein said second molten material is lead and a step of withdrawing fumes, gases and vapors includes generating a flow of air over the surface of said second molten material and directing this flow of air into a water bath for condensing lead fumes which have passed from said second molten material into said water so that the lead is precipitated therefrom and conveying the condensed lead progressively from said water bath.

23. The method defined in claim 12 wherein said second molten material is lead and said first molten material is steel and a step of withdrawing fumes, gases and vapors from the surface of said second molten material includes collecting the fumes from the surface of said second molten material and directing them into a bath of water for condensing any lead vapors into a solid condition and thereafter removing the condensed lead from said water.

24. An apparatus for producing a continuous thin sheet of material, comprising:
   (a) first means for heating a first material having a first melting temperature and a first specific gravity into a first molten material;
   (b) second means for heating a second material having a second melting temperature and having a second specific gravity into a second molten material; the second melting temperature being less than the first melting temperature, and the second specific gravity being greater than the first specific gravity, said first and second molten materials being immiscible with respect to each other;
   (c) third means for containing the second molten material to expose an upper surface thereof; and
   (d) a roller having a cylindrical surface partially immersed into the first molten material and a rotation means for rotating said roller, said roller causing a layer of the first molten material to be picked up and carried upon the cylindrical surface thereof when said roller is rotated by the rotation means, for floating said first molten material onto the upper surface of the second molten material to thereby form a solidified sheet of said first material.

25. The apparatus of claim 24, wherein the first means further comprises a first melting tank for holding the first molten material and a means for maintaining and controlling the temperature of the first molten material in the first melting tank.

26. The apparatus of claim 24, further comprising a means for removing the layer of first molten material picked up and carried upon the cylindrical surface of said roller from the surface thereof, and for transferring the layer of said first molten material to the upper surface of the second molten material.

27. The apparatus of claim 24, further comprising a removal means for removing the solidified sheet of said first material from the upper surface of the second molten material, said removal means comprising a plurality of rollers for engaging the solidified sheet of said first material from beneath the first material, and rotating means for rotating at least one of the rollers to advance the solidified sheet of first material from said second means, the upper surfaces of the rollers being positioned beneath the solidified sheet of first material and the upper surfaces of some rollers being positioned above the upper surface of the second molten material.

28. The apparatus of claim 24, further comprising a means for maintaining the level of the surface of the second molten material with respect to the first means.

29. The apparatus of claim 24, further comprising exhaust means over said upper surface of said second molten material for removing the fumes, gases and vapors released therefrom.

30. The apparatus of claim 29, wherein said exhaust means further comprises a hood over said second molten material and a blower for creating a partial vacuum in said hood and for creating a flow of air to entrain fumes, gases and vapors and means for directing the flow of air into a liquid for condensing a portion of said fumes, gases and vapors.

31. The apparatus defined in claim 29, wherein said exhaust means includes a hood, a blower having an intake and a discharge, a conduit connected between said hood and said intake of said blower, a second conduit connected to the discharge of said blower, and a vat for containing water therein, the second conduit leading from the discharge side of said blower to a position beneath the level of said water whereby air passing into said hood entrains fumes, gases and vapors emerging from the surface of said second molten material and is conveyed from said hood into said water for condensing a portion of the fumes, gases and vapors.

32. The apparatus defined in claim 31, including a conveyor for removing particles condensed from the air which has been discharged into said water.

* * * * *